US012009137B2

(12) United States Patent
Kubota et al.

(10) Patent No.: US 12,009,137 B2
(45) **Date of Patent: *Jun. 11, 2024**

(54) MAGNETIC PARTICLES, DUST CORE, AND COIL COMPONENT

(71) Applicant: Murata Manufacturing Co., Ltd., Kyoto-fu (JP)

(72) Inventors: Hironobu Kubota, Nagaokakyo (JP); Yuya Ishida, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,004

(22) Filed: Oct. 4, 2022

(65) Prior Publication Data

US 2023/0039573 A1 Feb. 9, 2023

Related U.S. Application Data

(63) Continuation of application No. 16/505,441, filed on Jul. 8, 2019, now Pat. No. 11,495,387, which is a (Continued)

(30) Foreign Application Priority Data

Jan. 12, 2017 (JP) ................................ 2017-003618

(51) Int. Cl.

*H01F 27/255* (2006.01)
*B22F 1/102* (2022.01)
(Continued)

(52) U.S. Cl.

CPC ............ *H01F 27/255* (2013.01); *B22F 1/102* (2022.01); *H01F 1/147* (2013.01); *H01F 27/28* (2013.01);
(Continued)

(58) Field of Classification Search

None
See application file for complete search history.

(56) References Cited

U.S. PATENT DOCUMENTS 4,923,689 A 5/1990 Uenishi et al.
5,039,559 A * 8/1991 Sang ........................ B03C 1/01 427/127
(Continued)

FOREIGN PATENT DOCUMENTS

JP 103-270106 A 12/1991
JP 2000-075557 A 3/2000
(Continued)

OTHER PUBLICATIONS

Lu et al., Nano Letters, 2002, v2#3, 183-186. (Year: 2002).*
(Continued)

*Primary Examiner* — Kevin M Bernatz
(74) *Attorney, Agent, or Firm* — Studebaker & Brackett PC

(57) ABSTRACT

Magnetic particles, each including a core made of a magnetic material, and an insulating coating film which covers a surface of the core made of a magnetic material. The insulating coating film is formed of a sol-gel reaction product of a mixture containing a metal alkoxide and an organic phosphoric acid or a salt thereof.

13 Claims, 3 Drawing Sheets

Related U.S. Application Data continuation of application No. PCT/JP2018/000068, filed on Jan. 5, 2018.

(51) Int. Cl.

| | |
|---|---|
| ***H01F 1/147*** | (2006.01) |
| ***H01F 1/24*** | (2006.01) |
| ***H01F 27/28*** | (2006.01) |
| ***H01F 41/02*** | (2006.01) |
| *B22F 1/10* | (2022.01) |

(52) U.S. Cl.

CPC ............ *H01F 41/0246* (2013.01); *B22F 1/10* (2022.01); *B22F 2301/35* (2013.01); *C22C 2202/02* (2013.01); *H01F 1/24* (2013.01)

(56) References Cited

U.S. PATENT DOCUMENTS

| | | | | |
|---|---|---|---|---|
| 5,429,899 | A * | 7/1995 | Chiba | H01F 41/16 428/407 |
| 6,791,445 | B2 | 9/2004 | Shibata et al. | |
| 9,856,359 | B2 * | 1/2018 | Nowak | B22F 9/24 |
| 10,210,973 | B2 * | 2/2019 | Shinohara | H01F 1/15333 |
| 10,224,133 | B2 * | 3/2019 | Ishida | H01F 1/15308 |
| 10,553,343 | B2 * | 2/2020 | Kubota | H01F 1/0306 |
| 10,854,364 | B2 * | 12/2020 | Shinohara | H01F 27/255 |
| 10,861,641 | B2 * | 12/2020 | Shinohara | H01F 27/327 |
| 11,011,298 | B2 * | 5/2021 | Shinohara | H01F 17/045 |
| 11,392,052 | B2 * | 7/2022 | Torii | G03G 9/0819 |
| 11,495,387 | B2 * | 11/2022 | Kubota | B22F 1/102 |
| 11,531,284 | B2 * | 12/2022 | Iguchi | G03G 9/09725 |
| 11,600,428 | B2 * | 3/2023 | Sato | H01F 27/255 |
| 11,776,727 | B2 * | 10/2023 | Shinohara | H01F 1/15375 336/233 |
| 2002/0149458 | A1 | 10/2002 | Fujiwara et al. | |
| 2004/0105980 | A1 * | 6/2004 | Sudarshan | H01F 1/447 428/404 |
| 2004/0126609 | A1 | 7/2004 | Ueta et al. | |
| 2006/0007526 | A1 * | 1/2006 | Cannas | G09F 9/375 359/296 |
| 2006/0166041 | A1 * | 7/2006 | Takeda | G11B 5/70 |
| 2007/0014730 | A1 * | 1/2007 | Briel | A61B 5/415 424/9.34 |
| 2008/0206146 | A1 * | 8/2008 | Akhtari | A61P 29/00 424/130.1 |
| 2008/0248245 | A1 * | 10/2008 | Maeda | H01F 1/33 427/127 |
| 2009/0202935 | A1 * | 8/2009 | Moriya | G03G 9/0815 430/124.1 |
| 2010/0012880 | A1 * | 1/2010 | Rampersaud | H01F 1/0054 252/62.51 R |
| 2010/0027192 | A1 | 2/2010 | Perry et al. | |
| 2010/0051851 | A1 | 3/2010 | Mitani et al. | |
| 2010/0193726 | A1 | 8/2010 | Maeda et al. | |
| 2011/0006246 | A1 | 1/2011 | Skaarman et al. | |
| 2011/0097584 | A1 | 4/2011 | Takahashi et al. | |
| 2011/0315913 | A1 | 12/2011 | Shigeoka et al. | |
| 2012/0048063 | A1 | 3/2012 | Maetani et al. | |
| 2012/0082844 | A1 | 4/2012 | Takahashi et al. | |
| 2012/0211693 | A1 | 8/2012 | Skaarman et al. | |
| 2012/0270986 | A1 * | 10/2012 | Maruyama | G02B 5/223 524/413 |
| 2012/0301720 | A1 * | 11/2012 | Koban | C09C 1/62 427/256 |
| 2013/0015394 | A1 | 1/2013 | Skaarman et al. | |
| 2013/0244159 | A1 | 9/2013 | Ishigami et al. | |
| 2013/0302428 | A1 * | 11/2013 | Schueth | H01F 1/01 427/127 |
| 2013/0344237 | A1 * | 12/2013 | Guo | H01F 1/42 427/127 |
| 2014/0364548 | A1 * | 12/2014 | Everhardus | C09D 11/322 524/265 |
| 2016/0071636 | A1 | 3/2016 | Ohtsubo et al. | |
| 2016/0102018 | A1 | 4/2016 | Dorris et al. | |
| 2017/0066908 | A1 | 3/2017 | Hatakeyama et al. | |
| 2017/0101538 | A1 * | 4/2017 | Kubo | C09D 17/00 |
| 2017/0294260 | A1 * | 10/2017 | Ishida | C22C 38/02 |
| 2017/0329248 | A1 * | 11/2017 | Nakamura | G03G 9/1133 |
| 2018/0161869 | A1 | 6/2018 | Ishimine | |
| 2018/0273789 | A1 | 9/2018 | Matsuzaki et al. | |
| 2019/0092958 | A1 * | 3/2019 | Okuda | C09D 11/54 |
| 2019/0321797 | A1 * | 10/2019 | Weaver | B01J 13/0065 |
| 2020/0114317 | A1 * | 4/2020 | Charest | B01D 71/68 |

FOREIGN PATENT DOCUMENTS

| | | | |
|---|---|---|---|
| JP | 2002196541 | A * | 7/2002 |
| JP | 2006-128663 | A | 5/2006 |
| JP | 2007-042891 | A | 2/2007 |
| JP | 2009-227923 | A | 10/2009 |
| JP | 2009-259939 | A | 11/2009 |
| JP | 2010-062217 | A | 3/2010 |
| JP | 4707054 | B2 | 6/2011 |
| JP | 2013-209693 | A | 10/2013 |
| JP | 2015-008263 | A | 1/2015 |
| JP | 2017-203852 | A | 11/2017 |
| WO | 2011/126120 | A1 | 10/2011 |

OTHER PUBLICATIONS

English Language Abstract for JP-2002196541-A. (Year: 2002).*

English language abstract of CN 106938861 A1 (Year: 2017).*

International Search Report issued in PCT/JP2018/000068; mailed Mar. 27, 2018.

Written Opinion issued in PCT/JP2018/000068; mailed Mar. 27, 2018.

An Office Action mailed by the Japanese Patent Office on Jul. 21, 2020, which corresponds to Japanese Patent Application No. 2018-561342 and is related to U.S. Appl. No. 16/505,441 with English language translation.

An Office Action mailed by the Korean Patent Office on Aug. 11, 2020, which corresponds to Korean Patent Application No. 10-2019-7019936 and is related to U.S. Appl. No. 16/505,441 with English language translation.

An Office Action; "Notice of Reasons for Refusal," mailed by the Japanese Patent Office on Dec. 21, 2021, which corresponds to Japanese Patent Application No. 2020-127859 and is related to U.S. Appl. No. 16/505,441 with English language translation.

Bokov et al. "Nanomaterial by Sol-Gel Method: Synthesis and Application" (Adv Mat Sci Eng; 2021) (Year: 2021).

Danks, A., Hall, S., Schnepp, Z., Mat. Hor., 2016, 3, 91-112. (Year: 2016).

Young, Sandra, "Overview of Sol-Gel Science and Technology", Army Res Lab, 2002. (Year: 2002).

Denaturization—Biochemistry Wikipedia entry (Year: 2022).

* cited by examiner

MAGNETIC PARTICLES, DUST CORE, AND COIL COMPONENT

CROSS-REFERENCE TO RELATED APPLICATIONS

This application is a Continuation of U.S. patent application Ser. No. 16/505,441 filed on Jul. 8, 2019, now U.S. Pat. No. 11,495,387, which claims benefit of priority to International Patent Application No. PCT/JP2018/000068, filed Jan. 5, 2018, and to Japanese Patent Application No. 2017-003618, filed Jan. 12, 2017, the entire contents of each are incorporated herein by reference.

BACKGROUND

Technical Field

The present disclosure relates to magnetic particles, and more specifically, magnetic particles, each coated with an insulating coating film. The present disclosure also relates to a dust core produced by using the magnetic particles, and a coil component produced by using the magnetic particles.

Background Art

Coil components, such as inductors and choke coils, are used in various electrical devices and electronic devices. A coil component generally includes a coil and a magnetic core. In recent years, the size of electrical devices and electronic devices has been increasingly reduced, and consequently, there has been a demand for reduction in size of coil components used therein. Furthermore, besides being small-sized, coil components are required to have excellent magnetic, electrical and mechanical characteristics, and therefore, magnetic cores are required to have high magnetic permeability, high magnetic flux density, low loss, and high strength. In particular, when used in the high-frequency range, in order to suppress an increase in eddy current loss, magnetic cores are required to have high specific resistance. In order to satisfy such requirements, dust cores are known which are produced by forming a soft magnetic material into fine particles (powder), covering a surface of each particle with an insulating coating film, and performing compression molding. For example, Japanese Unexamined Patent Application Publication No. 2009-259939 discloses a dust core obtained by compression molding of a powder of a soft magnetic material in which a surface of each particle of the powder is coated with an insulating coating film and further coated with a coupling layer formed of a silane coupling agent. Furthermore, Japanese Unexamined Patent Application Publication No. 2013-209693 discloses a dust core obtained by compression molding of a powder of a magnetic metal material in which a surface of each particle of the powder is coated with carbon and further coated with a metal oxide composed mainly of silicon oxide.

SUMMARY

Regarding the dust core according to each of Japanese Unexamined Patent Application Publication No. 2009-259939 and Japanese Unexamined Patent Application Publication No. 2013-209693, although a certain specific resistance can be secured, the specific resistance is not necessarily sufficient to suppress eddy current loss when used in the high-frequency range.

Accordingly, the present disclosure provides magnetic particles which are used to produce a dust core having high relative permeability and high specific resistance, a dust core produced by using the magnetic particles, and a coil component produced by using the magnetic particles.

The present inventors have performed thorough studies in order to solve the problems described above. As a result, it has been found that, by forming an insulating coating film, by a sol-gel reaction using a metal alkoxide and an organic phosphoric acid or a salt thereof, on a surface of each core made of a magnetic material used for producing a dust core, it is possible to obtain magnetic particles that can be used to produce a component having high specific resistance and high relative permeability, thus leading to the present disclosure.

According to a first aspect of the present disclosure, there are provided magnetic particles, each including a core made of a magnetic material, and an insulating coating film which covers the core made of a magnetic material, in which the insulating coating film is formed of a sol-gel reaction product of a mixture containing a metal alkoxide and an organic phosphoric acid or a salt thereof. Here, the expression "the insulating coating film is formed of a sol-gel reaction product" means that the insulating coating film contains a sol-gel reaction product.

According to a second aspect of the present disclosure, there is provided a dust core obtained by compression molding of the magnetic particles.

According to a third aspect of the present disclosure, there is provided a coil component including the dust core, and a coil wound around the dust core.

According to a fourth aspect of the present disclosure, there is provided a coil component including a body which contains the magnetic particles and a resin, and a coil embedded in the body.

According to a fifth aspect of the present disclosure, there are provided magnetic particles, each including a core made of a magnetic material and an insulating coating film which covers the core made of a magnetic material, in which the insulating coating film is made from a mixture containing a metal alkoxide and a surfactant. The magnetic particles are mixed with a resin to form a body of a coil component.

According to the present disclosure, by forming an insulating coating film, by a sol-gel reaction using sol-gel reactants including an organic phosphoric acid or a salt thereof, on a surface of each core made of a magnetic material, it is possible to provide magnetic particles whose surfaces have high insulating properties. Since a dust core or a body obtained by compression molding of magnetic particles according to the present disclosure has high specific resistance, by using such a dust core or body, it is possible to provide a coil component in which eddy current loss in the high-frequency range is suppressed.

DESCRIPTION OF EMBODIMENTS

First Embodiment

Figure 1:
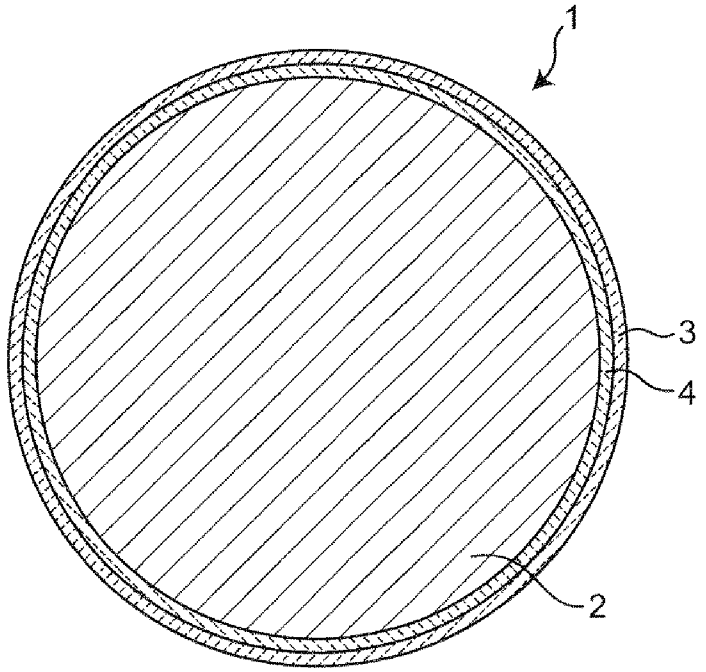
FIG. 1 is a schematic cross-sectional view showing a core made of a magnetic material and first and second insulating coating films covering the core according to the present disclosure.

Magnetic particles according to the present disclosure each include a core made of a magnetic material and a first insulating coating film disposed on a surface thereof, the first insulating coating film being formed of a sol-gel reaction product of a mixture containing a metal alkoxide and an organic phosphoric acid or a salt thereof.

The magnetic particles according to the present disclosure are produced as described below.

First, cores made of a magnetic material are prepared. The cores are particles of a magnetic material, and magnetic particles according to the present disclosure each include a particle of a magnetic material which is a core and an insulating coating film which is a shell covering the core (particle).

The magnetic material is not particularly limited, but is preferably a soft magnetic material, in particular, a soft magnetic material containing iron. By using the soft magnetic material, a dust core having high magnetic flux density and high magnetic permeability can be obtained.

The soft magnetic material containing iron is not particularly limited, but for example, may be iron, an Fe—Si alloy, an Fe—Al alloy, an Fe—Ni alloy, an Fe—Co alloy, an Fe—Si—Al alloy, an Fe—Si—Cr alloy, or the like.

The average particle size (D50: a particle size at a point where the accumulated value is 50% in a cumulative curve of a particle size distribution on the basis of volume assuming that the total volume is 100%) of the core made of a magnetic material is not particularly limited, but for example, can be 0.01 μm or more and 300 μm or less (i.e., from 0.01 μm to 300 μm), preferably 1 μm or more and 200 μm or less (i.e., from 1 μm to 200 μm), and more preferably 10 μm or more and 100 μm or less (i.e., from 10 μm to 100 μm). By setting the average particle size in the range described above, the effect of suppressing eddy current loss can be increased, and magnetic permeability can be further increased.

Next, a first insulating coating film is formed on the core made of a magnetic material. Note that the core may be covered in advance with a second insulating coating film. That is, the second insulating coating film may be present between the first insulating coating film and the surface of the core.

In the present disclosure, the first insulating coating film is formed by using a sol-gel reaction. Specifically, the first insulating coating film is formed of a sol-gel reaction product of a mixture containing a metal alkoxide and an organic phosphoric acid or a salt thereof. The surface of the magnetic particle is preferably constituted by the first insulating coating film. Since the first insulating coating film is formed of the sol-gel reaction product, cracks are unlikely to occur, and good slip properties can be obtained. Therefore, it is possible to provide a dust core and a coil component each having high specific resistance and high relative permeability.

First, a sol mixture containing a metal alkoxide and an organic phosphoric acid or a salt thereof is prepared.

The mixture is obtained by dissolving or dispersing the metal alkoxide and the organic phosphoric acid or a salt thereof in a solvent.

The metal alkoxide is not particularly limited, but may be, for example, a compound represented by $M^1(OR^1)_n$. In the formula, $M^1$ is Si, Ti, Zr, or Al. n is an arbitrary number and is appropriately determined depending on the valence of $M^1$. $R^1$ is a hydrocarbon group, preferably an alkyl group or an aryl group, and more preferably an alkyl group. The alkyl group is preferably an alkyl group having 1 to 6 carbon atoms, more preferably an alkyl group having 1 to 4 carbon atoms, and can be, for example, a methyl group, an ethyl group, an n-propyl group, an isopropyl group, an n-butyl group, an isobutyl group, a sec-butyl group, or a tert-butyl group. The aryl group is preferably an aryl group having 6 to 12 carbon atoms, more preferably an aryl group having 6 to 8 carbon atoms, and can be, for example, a phenyl group.

In a preferred embodiment, the metal alkoxide is tetraethoxysilane, titanium tetraisopropoxide, zirconium n-butoxide, or aluminum isopropoxide.

The metal alkoxides described above may be used alone, or two or more of them may be used.

The organic phosphoric acid is represented by $(R^2O)P(=O)(OH)_2$ or $(R^2O)_2P(=O)OH$. In the formula, $R^2$ is each independently a hydrocarbon group. $R^2$ has a chain length of preferably 5 atoms or more, more preferably 10 atoms or more, and still more preferably 20 atoms or more. $R^2$ has a chain length of preferably 200 atoms or less, more preferably 100 atoms or less, and still more preferably 50 atoms or less. That is, in the organic phosphoric acid, hydrogen of at least one hydroxyl group of the phosphoric acid is replaced by a hydrocarbon group. The hydrocarbon group has a carbon chain length of preferably 5 atoms or more, more preferably 10 atoms or more, and still more preferably 20 atoms or more. As the length of the hydrocarbon group increases, slip properties of the surfaces of the magnetic particles can be enhanced, and the density of the magnetic material in a coil component can be increased, which is preferable. The hydrocarbon group may have a carbon chain length of 100 atoms or less. The hydrocarbon group of the organic phosphoric acid functions as a lipophilic group, and the hydroxyl group of the organic phosphoric acid functions as a hydrophilic group. The hydroxyl group of the organic phosphoric acid is condensed with the metal alkoxide and/or a silane coupling agent, which will be described later, to form a sol-gel reaction product. It is considered that the lipophilic group of the organic phosphoric acid incorporated into the product improves conformability to the resin constituting the body of the coil component at the surfaces of magnetic particles, and reduces friction between magnetic particles, thereby contributing to improvement in the filling ratio of magnetic particles in the coil component.

The hydrocarbon group is preferably an optionally substituted alkyl ether group or phenyl ether group. Examples of the substituent include an alkyl group, a phenyl group, a polyoxyalkylene group, a polyoxyalkylene styryl group, a polyoxyalkylene alkyl group, and an unsaturated polyoxyethylene alkyl group.

The salt of the organic phosphoric acid is a salt between an organic phosphoric acid anion formed by elimination of H of at least one OH group of the organic phosphoric acid and a counter-cation.

The organic phosphoric acid anion in the organic phosphoric acid salt can be $(R^2O)P(=O)(O^-)_2$, $(R^2O)P(=O)(OH)(O^-)$, or $(R^2O)_2P(=O)O^-$.

The counter-cation in the phosphoric acid salt is not particularly limited, and examples thereof include an ion of an alkali metal, such as Li, Na, K, Rb, or Cs; an ion of an alkaline earth metal, such as Be, Mg, Ca, Sr, or Ba; an ion of any other metal, such as Cu, Zn, Al, Mn, Ag, Fe, Co, or Ni; $NH_4^+$, and an amine ion. Preferably, the counter-cation can be $Li^+$, $Na^+$, $K^+$, $NH_4^+$, or an amine ion.

In a preferred embodiment, the organic phosphoric acid salt is a polyoxyalkylene styryl phenyl ether phosphoric acid salt, a polyoxyalkylene alkyl ether phosphoric acid salt, a polyoxyalkylene alkyl aryl ether phosphoric acid salt, an alkyl ether phosphoric acid salt, or an unsaturated polyoxyethylene alkyl phenyl ether phosphoric acid salt, and the counter-cation constituting the salt may be $Li^+$, $Na^+$, $K^+$, $NH_4^+$, or an amine ion.

The phosphoric acids or the salts thereof described above may be used alone, or two or more of them may be used.

In the mixture, the content of the metal alkoxide is preferably 0.06 parts by weight or more and 15.0 parts by weight or less (i.e., from 0.06 parts by weight to 15.0 parts by weight), more preferably 0.1 parts by weight or more and 4.0 parts by weight or less (i.e., from 0.1 parts by weight to 4.0 parts by weight), and still more preferably 0.2 parts by weight or more and 2.0 parts by weight or less (i.e., from 0.2 parts by weight to 2.0 parts by weight), relative to 100 parts by weight of the magnetic material. By setting the content of the metal alkoxide in the range described above, it is possible to further increase the specific resistance of a dust core obtained from the magnetic particles.

In the mixture, the content of the organic phosphoric acid or a salt thereof is preferably 0.05 parts by weight or more, more preferably 0.3 parts by weight or more, and preferably 0.3 parts by weight or more and 10 parts by weight or less (i.e., from 0.3 parts by weight to 10 parts by weight), more preferably 0.5 parts by weight or more and 5.0 parts by weight or less (i.e., from 0.5 parts by weight to 5.0 parts by weight), relative to 100 parts by weight of the magnetic material. By setting the content of the organic phosphoric acid or a salt thereof in the range described above, it is possible to further increase the specific resistance of a dust core obtained from the magnetic particles.

In the mixture, the weight ratio of the metal alkoxide to the organic phosphoric acid or a salt thereof (metal alkoxide/organic phosphoric acid or a salt thereof) is preferably 0.06 or more and 40.0 or less (i.e., from 0.06 to 40.0), more preferably 0.06 or more and 15.0 or less (i.e., from 0.06 to 15.0), and still more preferably 0.2 or more and 15.0 or less (i.e., from 0.2 or more to 15.0). By setting the weight ratio of the metal alkoxide to the organic phosphoric acid or a salt thereof in the range described above, it is possible to further increase the specific resistance of a dust core obtained from the magnetic particles.

In a preferred embodiment, part of the metal alkoxide may be replaced by a silane coupling agent. That is, the mixture may further contain a silane coupling agent in addition to the metal alkoxide and the organic phosphoric acid or a salt thereof.

The replacement amount of the silane coupling agent is preferably 2% by weight or more and 50% by weight or less (i.e., from 2% by weight to 50% by weight) of the metal alkoxide. That is, the content of the silane coupling agent in the mixture is 2% by weight or more and 50% by weight or less (i.e., from 2% by weight to 50% by weight), for example, 10% by weight or more and 40% by weight or less (i.e., from 10% by weight to 40% by weight), relative to the total of the metal alkoxide and the silane coupling agent. By incorporating the silane coupling agent in the range described above, it is possible to further increase the specific resistance of a dust core obtained from the magnetic particles.

In the mixture, the total amount of the metal alkoxide and the silane coupling agent can be preferably 0.05% by weight or more and 20.0% by weight or less (i.e., from 0.05% by weight to 20.0% by weight), more preferably 0.2% by weight or more and 15.0% by weight or less (i.e., from 0.2% by weight to 15.0% by weight), and still more preferably 0.3% by weight or more and 10% by weight or less (i.e., from 0.3% by weight to 10% by weight), relative to the whole mixture.

The silane coupling agent is not particularly limited, but for example, may be a compound represented by $R^aSiR^b_mR^c_{3-m}$.

In the formula, $R^a$ can be an optionally substituted alkyl group having 1 to 20 carbon atoms or an optionally substituted aryl group having 6 to 20 carbon atoms. $R^a$ is preferably an optionally substituted alkyl group having 1 to 20 carbon atoms, more preferably an optionally substituted alkyl group having 3 to 20 carbon atoms, and still more preferably an optionally substituted alkyl group having 8 to 20 carbon atoms.

The substituent in the optionally substituted alkyl group having 1 to 20 carbon or the optionally substituted aryl group having 6 to 20 carbon atoms is not particularly limited, but may be an acryloyloxy group, a methacryloyloxy group, an epoxy group, a glycidyloxy group, an amino group, a substituted amino group, or the like. The substituent of the substituted amino group is not particularly limited, but may be an alkyl group having 1 to 6 carbon atoms, an aminoalkyl group having 1 to 6 carbon atoms, or the like.

$R^b$ is —OH, —$OR^d$, —$OCOR^d$, —$NR^d_2$, or —$NHR^d$ (in these formulae, $R^d$ is a substituted or unsubstituted alkyl group having 1 to 4 carbon atoms, preferably a methyl group), preferably —$OR^d$, more preferably a methoxy group or an ethoxy group, and particularly preferably a methoxy group.

$R^c$ is a hydrogen atom, an alkyl group having 1 to 6 carbon atoms, or an aryl group having 6 to 10 carbon atoms, and preferably a methyl group, an ethyl group, or a phenyl group.

m is 1, 2, or 3, and preferably 3.

In a preferred embodiment, the silane coupling agent is $R^aSi(OR^d)_3$.

Examples of the silane coupling agent include octadecyltrimethoxysilane, hexadecyltrimethoxysilane, aminopropyltriethoxysilane, 3-glycidyloxypropyltrimethoxysilane, 8-methacryloyloxy-octyltrimethoxysilane, 8-(2-aminoethylamino)octyltrimethoxysilane, 8-glycidyloxy-octyltrimethoxysilane, 3-(methacryloyloxy)propyltrimethoxysilane, and decyltrimethoxysilane.

The silane coupling agents described above may be used alone, or two or more of them may be used.

The solvent is not particularly limited, but is preferably an alcohol, an ether, a glycol, or a glycol ether. In a preferred embodiment, the solvent can be methanol, ethanol, 1-propanol, 2-propanol, 1-butanol, 2-butanol, isobutyl alcohol, 1-pentanol, 2-pentanol, 2-methyl-2-pentanol, 2-methoxyethanol, 2-ethoxyethanol, 2-butoxyethanol, ethylene glycol, diethylene glycol, triethylene glycol, propylene glycol, dipropylene glycol monomethyl ether, diethylene glycol monomethyl ether, diethylene glycol monoethyl ether, diethylene glycol monobutyl ether, triethylene glycol monomethyl ether, or diethylene glycol monohexyl ether. Furthermore, the solvent may contain water as required.

The solvents described above may be used alone, or two or more of them may be used.

In an embodiment, the mixture may contain various additives, such as a catalyst, a pH adjuster, a stabilizing agent, and a thickener. Examples of the additives include acid compounds, such as boric acid compounds, and base compounds, such as ammonia compounds.

Next, by applying the mixture so as to cover the cores made of a magnetic material, followed by drying, the mixture is hardened to form an insulating coating film (first insulating coating film). In this way, magnetic particles are obtained. Drying is performed so that the solvent in the mixture can be volatilized, and the particles to which the mixture has been applied may be heated, or air may be sent to the particles. Note that drying by heating promotes hardening of the metal alkoxide and/or the silane coupling agent in the mixture, and a denser film is likely to be formed, which is preferable.

The method for applying the mixture to the particles of a magnetic material is not particularly limited, but for example, a method in which the particles of a magnetic material are added into the mixture, and stirring and separation by filtration are performed may be used. The stirring time can be preferably 10 minutes or more and 5 hours or less (i.e., from 10 minutes to 5 hours), more preferably 30 minutes or more and 3 hours or less (i.e., from 30 minutes to 3 hours), and still more preferably 1 hour or more and 2 hours or less (i.e., from 1 hour to 2 hours).

In the embodiment described above, a mixture is prepared, and by adding particles of a magnetic material into the mixture, the mixture is applied to the particles. However, the method is not limited thereto. For example, particles of a magnetic material, a metal alkoxide and/or a silane coupling agent, and an organic phosphoric acid or a salt thereof may be separately added and mixed. Furthermore, an insulating coating film may be formed by a method in which a metal alkoxide and an organic phosphoric acid or a salt thereof are poured into particles of a magnetic material, the resulting mixture is subjected to a sol-gen reaction, then a silane coupling agent is poured thereinto, and a sol-gel reaction is carried out again.

In the case where heating is performed in the drying step, the heating temperature can be preferably 40° C. or higher and 500° C. or lower (i.e., from 40° C. to 500° C.), more preferably 50° C. or higher and 400° C. or lower (i.e., from 50° C. to 400° C.), and still more preferably 60° C. or higher and 350° C. or lower (i.e., from 60° C. to 350° C.).

In the case where heating is performed in the drying step, the heating time can be preferably 10 minutes or more and 5 hours or less (i.e. from 10 minutes to 5 hours), more preferably 30 minutes or more and 3 hours or less (i.e., from 30 minutes to 3 hours), and still more preferably 1 hour or more and 2 hours or less (i.e., from 1 hour to 2 hours).

In the resulting magnetic particles, since cores are each coated with an insulating coating film (i.e., a first insulating coating film), high insulating properties between particles are obtained.

The thickness of the first insulating coating film is preferably 1 nm or more and 100 nm or less (i.e., from 1 nm to 100 nm). By setting the thickness of the first insulating coating film at 1 nm or more, the specific resistance of the magnetic particles can be increased. Furthermore, by setting the thickness of the first insulating coating film at 100 nm or less, the ratio of the magnetic material in the magnetic particles can be increased, and magnetic characteristics of a coil component can be improved.

As shown in FIG. 1, a magnetic particle 1 may include, in addition to a first insulating coating film 3, a second insulating coating film 4 disposed between the first insulating coating film 3 and a core 2. In this case, even if a crack occurs in the first insulating coating film constituting the surface of the particle of the magnetic material, the crack is unlikely to advance to the second insulating coating film, and it is possible to suppress a decrease in insulating properties of magnetic particles.

The second insulating coating film is formed of a sol-gel reaction product of a mixture containing a metal alkoxide and an organic phosphoric acid or a salt thereof. Alternatively, the second insulating coating film is formed of a sol-gel reaction product of a mixture containing a metal alkoxide, an organic phosphoric acid or a salt thereof, and a silane coupling agent. Alternatively, the second insulating coating film is formed of a sol-gel reaction product of a mixture containing a metal alkoxide and a silane coupling agent. Alternatively, the second insulating coating film is a film of a metal salt, such as iron phosphate, formed by phosphatization. Alternatively, the second insulating coating film is composed of an oxide of a magnetic material. The second insulating coating film may be composed of the same material as or a different material from that of the first insulating coating film.

Regarding the thickness of the second insulating coating film, preferably, the total thickness of the second insulating coating film and the first insulating coating film is 1 nm or more and 100 nm or less (i.e., from 1 nm to 100 nm). By setting the total thickness of the first and second insulating coating films at 1 nm or more, the specific resistance of the magnetic particles can be increased. Furthermore, by setting the total thickness at 100 nm or less, the ratio of the magnetic material in the magnetic particles can be increased, and magnetic characteristics of a coil component can be improved.

A dust core produced by using magnetic particles obtained as described above has high relative permeability and high specific resistance. Accordingly, in the case where the dust core is used as a magnetic core of a coil component, while exhibiting high electrical characteristics, eddy current loss can be suppressed.

Figure 2:
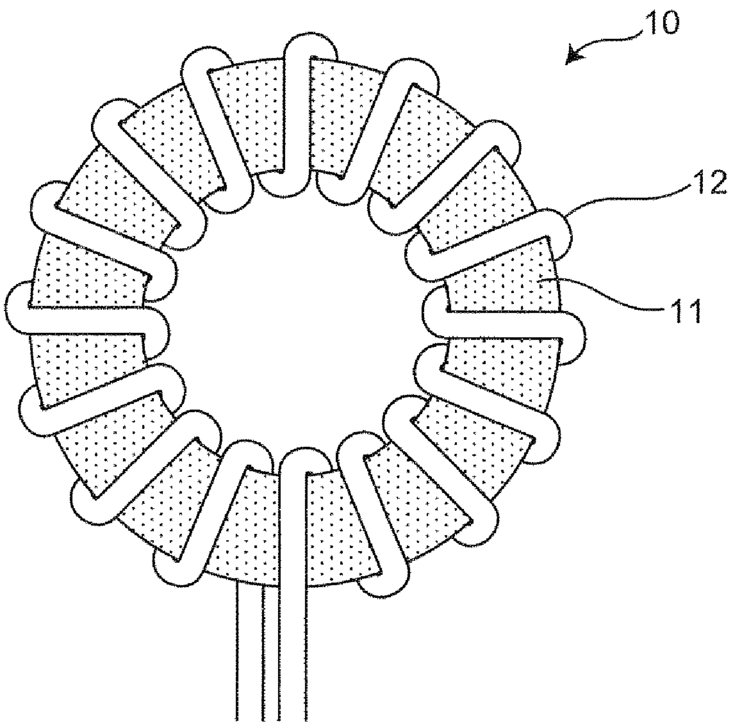
FIG. 2 is a cross-sectional view showing a coil component produced by using a dust core according to the present disclosure.

Therefore, the present disclosure also provides a dust core obtained by compression molding of the magnetic particles according to the present disclosure. Furthermore, as shown in FIG. 2, the present disclosure also provides a coil component 10 including a dust core 11 according to the present disclosure described above, and a coil 12 wound around the dust core.

The dust core can be produced by a known method in the relevant field. For example, a dust core according to the present disclosure can be obtained by performing compression molding on mixed powder in which a binder (e.g., a silicone resin) is added to magnetic particles according to the present disclosure, and performing heat treatment on the resulting compact.

Figure 3:
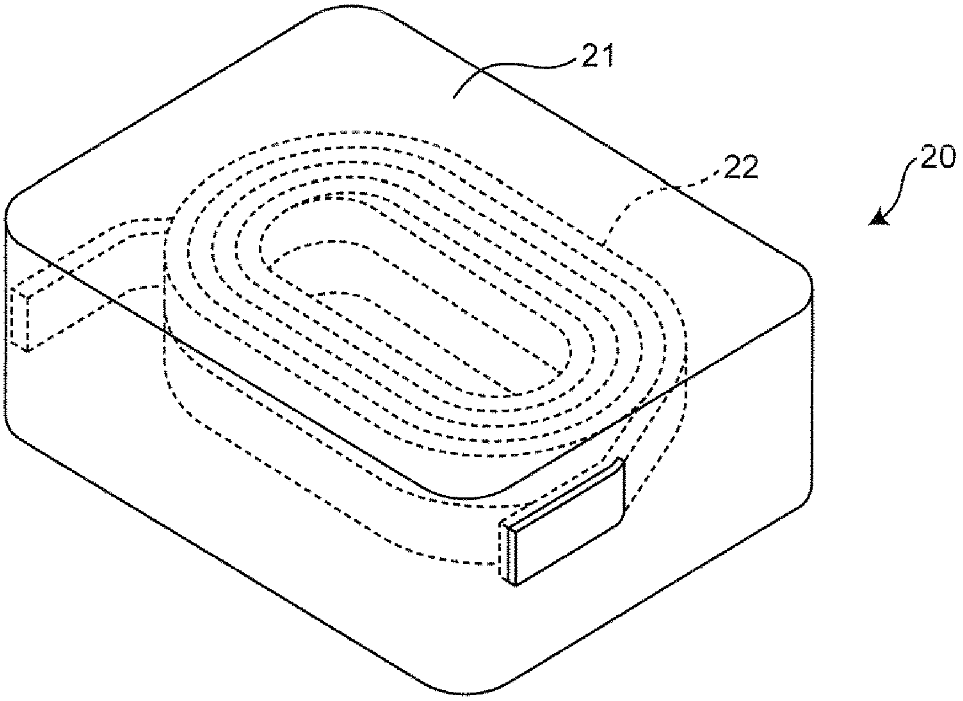
FIG. 3 is a cross-sectional view showing another coil component produced by using magnetic particles according to the present disclosure.

Furthermore, as shown in FIG. 3, the present disclosure also provides a coil component 20 including a body 21 which contains the magnetic particles obtained as described above and a resin, and a coil 22 embedded in the body.

In this coil component, since the surface of each magnetic particle is coated with the first insulating coating film containing an organic phosphoric acid or a salt thereof having a hydrocarbon group, magnetic particles can be satisfactorily dispersed in a resin, and by enhancing the filling performance of magnetic particles in the body, the magnetic permeability of the body can be improved. Furthermore, magnetic flux concentration can be reduced, and the saturated magnetic flux density can be increased. Moreover, in the case where magnetic particles are made from a mixture containing a silane coupling agent, slip properties of the first insulating coating film can be enhanced, and the magnetic permeability of the body can be improved.

Second Embodiment

In this embodiment, magnetic particles each include a core made of a magnetic material and an insulating coating film which covers the core, in which the insulating coating film is made from a mixture containing a metal alkoxide and a surfactant. Since the magnetic material and the metal alkoxide are the same as those in the first embodiment, descriptions thereof will be omitted.

A surfactant is a compound having a lipophilic group and a hydrophilic group. In this embodiment, since magnetic particles are formed so as to include a surfactant having a lipophilic group and a hydrophilic group, while the hydrophilic group enhances affinity for the metal alkoxide, by arranging the lipophilic group on the surfaces of magnetic particles, the surfaces can be configured to have good slip properties. In this way, while enhancing conformability to the resin constituting the body of the coil component, by reducing friction between magnetic particles, the filling ratio of magnetic particles in the coil component can be increased. The organic phosphoric acid or a salt thereof in the first embodiment is also a surfactant.

The lipophilic group contained in the surfactant is the hydrocarbon group described in the first embodiment. Preferably, the hydrocarbon group contains an oxyethylene group. The hydrophilic group of the surfactant is, for example, a hydroxyl group, a sulfonyl group, a phosphate group, or an ammonium cation. Preferably, the surfactant has a hydroxyl group. In a hydroxyl group-containing surfactant, the hydroxyl group can react with a metal alkoxide or a silane coupling agent, and the surfactant can be incorporated into a sol-gel reaction product. By arranging the lipophilic group of the surfactant on the surfaces of magnetic particles, friction between the magnetic particles can be suppressed. The hydrophilic group contained in the surfactant is, in particular, preferably a hydroxyl group of phosphoric acid. The hydroxyl group of phosphoric acid has high reactivity and can efficiently react with a metal alkoxide or a silane coupling agent.

As the surfactant, any of anionic, nonionic, and cationic surfactants can be used. Examples of an anionic surfactant include the organic phosphoric acid or a salt thereof described in the first embodiment, sodium polyoxyethylene tridecyl ether sulfate, sodium dodecylbenzenesulfonate, and polyoxyethylene alkyl ether styrenated phenyl ether ammonium sulfate. Examples of a nonionic surfactant include polyoxyethylene tridecyl ether and polyoxyethylene sorbitan monostearate. Examples of a cationic surfactant include lauryl trimethyl ammonium chloride and lauryl dimethyl ethyl ammonium ethyl sulfate.

The content of the surfactant is preferably 0.05 parts by weight or more, more preferably 0.3 parts by weight or more, and preferably 0.3 parts by weight or more and 10 parts by weight or less (i.e., from 0.3 parts by weight to 10 parts by weight), more preferably 0.5 parts by weight or more and 5.0 parts by weight or less (i.e., from 0.5 parts by weight to 5.0 parts by weight), relative to 100 parts by weight of the magnetic material. By setting the content of the surfactant in the range described above, it is possible to further increase the specific resistance of a dust core obtained from the magnetic particles.

The weight ratio of the metal alkoxide to the surfactant (metal alkoxide/surfactant) is preferably 0.06 or more and 40 or less (i.e., from 0.06 to 40), and more preferably 0.06 or more and 15 or less (i.e., from 0.06 to 15). By setting the weight ratio of the metal alkoxide to the surfactant in the range described above, it is possible to further increase the specific resistance of a dust core and a body obtained from the magnetic particles.

The mixture in this embodiment may further contain a silane coupling agent. Since the silane coupling agent is the same as that in the first embodiment, a description thereof will be omitted.

The amount of the silane coupling agent is preferably 2% by weight or more and 50% by weight or less (i.e., from 2% by weight to 50% by weight) of the metal alkoxide. That is, the content of the silane coupling agent in the mixture is 2% by weight or more and 50% by weight or less (i.e., from 2% by weight to 50% by weight), for example, 10% by weight or more and 40% by weight or less (i.e., from 10% by weight to 40% by weight), relative to the total of the metal alkoxide and the silane coupling agent. By incorporating the silane coupling agent in the range described above, it is possible to further increase the specific resistance of a dust core and a body obtained from the magnetic particles.

Magnetic particles of this embodiment can be used as a material for a coil component. A coil component includes, for example, a body which contains the magnetic particles and a resin, and a coil embedded in the body. Since the coil component produced by using the magnetic particles of this embodiment is made from a mixture containing a surfactant, friction with the resin is suppressed, the filling ratio of the magnetic particles is high, and excellent magnetic permeability can be exhibited.

EXAMPLES

Example 1

As described below, magnetic particles, each including a first insulating coating film made from a mixture containing a metal alkoxide and an organic phosphoric acid or a salt thereof, and a dust core formed of such magnetic particles were produced.

As a magnetic material, Fe—Si—Cr alloy particles (average particle size 30 μm) were prepared. Regarding Sample No. 24, phosphatized Fe—Si—Cr alloy particles (average particle size 30 μm) were prepared. That is, magnetic particles of Sample No. 24 each had a coating film of a metal phosphate as a second insulating coating film.

The following compounds were prepared as metal alkoxides.

Alkoxide 1: tetraethoxysilane
Alkoxide 2: titanium tetraisopropoxide
Alkoxide 3: zirconium n-butoxide
Alkoxide 4: aluminum isopropoxide The following compounds were prepared as organic phosphoric acids or salts thereof.

Phosphoric acid salt 1: sodium polyoxyalkylene styryl phenyl ether phosphate
Phosphoric acid salt 2: sodium polyoxyalkylene alkyl ether phosphate
Phosphoric acid salt 3: polyoxyalkylene alkyl aryl ether phosphoric acid monoethanolamine salt
Phosphoric acid salt 4: sodium alkyl ether phosphate
Phosphoric acid salt 5: unsaturated polyoxyethylene alkyl phenyl ether ammonium phosphate
Phosphoric acid 6: polyoxyalkylene styryl phenyl ether phosphoric acid
Phosphoric acid 7: polyoxyalkylene alkyl ether phosphoric acid
Phosphoric acid 8: polyoxyalkylene alkyl aryl ether phosphoric acid 70 g of ethanol in which 10.0 g of 16% (by weight) ammonia water was dissolved was prepared. A metal alkoxide and an organic phosphoric acid or a salt thereof were added to this solution such that the amount of use relative to 100 parts by weight the magnetic material to be added later satisfied the ratio shown in Table 1.

Next, 30 g of the magnetic material (Fe—Si—Cr alloy) was added thereto, followed by stirring for 120 minutes. The reaction solution was subjected to separation by filtration, and treated powder was dried at 80° C. for 120 minutes to thereby form an insulating coating film on the surface of each particles of the magnetic material. In this way, magnetic particles each having a surface coated with the insulating coating film were obtained.

Next, the resulting magnetic particles and a silicone resin serving as a binder (4.2 parts by weight relative to 100 parts by weight of the magnetic material) were mixed, compression molding was performed at a pressure of 400 MPa, and heating was performed at 200° C. for one hour. In such a manner, a toroidal core with an inside diameter of 4 mm, an outside diameter of 9 mm and a thickness of 1 mm and a square plate sample of 3 mm×3 mm×1 mm were produced.

(Evaluation)

Relative Permeability

By using an RF impedance analyzer (E4991A) manufactured by Agilent Technologies, Ltd., the relative permeability of the resulting toroidal coil at 1 MHZ and 1 Vrms was measured (the average value when n=3 is shown in Table 1).

Specific Resistance

By using a high resistance meter (R8340A ULTRA HIGH RESISTANCE METER) manufactured by Advantest Corporation, a direct voltage of 900 V was applied to the square plate sample, a resistance after 5 seconds was measured, and a specific resistance was calculated from the sample size (the average value when n=3 is shown in Table 1).

TABLE 1

| | Metal alkoxide | | Organic phosphoric acid or salt thereof | | | Specific |
|---|---|---|---|---|---|---|
| Sample No. | Type | Amount of use | Type | Amount of use | Relative permeability | resistance (Ω · cm) |
| 1 | 1 | 2.0 | 1 | 0.05 | 28 | $7.8 \times 10^{6}$ |
| 2 | 1 | 2.0 | 1 | 0.25 | 33 | $3.7 \times 10^{7}$ |
| 3 | 1 | 2.0 | 1 | 0.3 | 37 | $5.6 \times 10^{11}$ |
| 4 | 1 | 2.0 | 1 | 0.5 | 37 | $6.2 \times 10^{12}$ |
| 5 | 1 | 2.0 | 1 | 1.0 | 37 | $5.5 \times 10^{12}$ |
| 6 | 1 | 2.0 | 1 | 1.5 | 38 | $6.8 \times 10^{12}$ |
| 7 | 1 | 2.0 | 1 | 5.0 | 38 | $5.3 \times 10^{12}$ |
| 8 | 1 | 2.0 | 1 | 10.0 | 38 | $5.2 \times 10^{12}$ |
| 9 | 1 | 15.0 | 6 | 1.0 | 38 | $3.2 \times 10^{11}$ |
| 10 | 1 | 2.0 | 1 | 1.5 | 38 | $5.0 \times 10^{12}$ |
| 11 | 1 | 0.6 | 6 | 1.0 | 35 | $3.8 \times 10^{12}$ |
| 12 | 2 | 2.0 | 1 | 10.0 | 36 | $2.3 \times 10^{11}$ |
| 13 | 3 | 4.0 | 1 | 5.0 | 36 | $5.2 \times 10^{10}$ |
| 14 | 4 | 2.0 | 1 | 10.0 | 37 | $1.2 \times 10^{11}$ |
| 15 | 1 | 2.0 | 2 | 1.0 | 37 | $3.7 \times 10^{12}$ |
| 16 | 1 | 2.0 | 3 | 1.0 | 37 | $4.1 \times 10^{12}$ |
| 17 | 1 | 2.0 | 4 | 1.0 | 38 | $4.3 \times 10^{12}$ |
| 18 | 1 | 2.0 | 5 | 1.0 | 37 | $3.9 \times 10^{12}$ |
| 19 | 1 | 0.06 | 6 | 1.0 | 36 | $1.2 \times 10^{10}$ |
| 20 | 1 | 2.0 | 7 | 3.0 | 37 | $6.2 \times 10^{12}$ |
| 21 | 1 | 2.0 | 8 | 1.0 | 38 | $5.2 \times 10^{11}$ |
| 22* | 1 | 0.6 | — | — | 28 | $3.7 \times 10^{5}$ |
| 23* | 1 | 2.0 | ** | 0.5 | 30 | $8.8 \times 10^{5}$ |
| 24 | 1 | 2.0 | 1 | 1.0 | 36 | $8.9 \times 10^{12}$ |

The amount of use of each of the metal alkoxide and the organic phosphoric acid or a salt thereof is the amount (parts by weight) relative to 100 parts by weight of Fe—Si—Cr alloy particles.

Samples 22 and 23 marked with * are comparative examples.

** indicates that an inorganic phosphoric acid is used in Sample No. 23.

It is confirmed from the results that by using an organic phosphoric acid or a salt thereof, high magnetic permeability and high specific resistance can be obtained. In particular, it is confirmed that in Samples 3 to 17 in which 0.3 parts by weight or more of a phosphoric acid salt is used relative to 100 parts by weight of Fe—Si—Cr alloy particles, high magnetic permeability and high specific resistance are achieved.

Comparative Example 1 (Dipping Method)

(Sample No. 22)

Magnetic particles, each having an insulating coating film formed on a surface thereof, were obtained in the same manner as that in Sample No. 11 of the Example except that 70 g of ethanol which did not contain ammonia, i.e., a sol-gel reaction catalyst, was prepared instead of 70 g of ethanol in which 10.0 g of 16% (by weight) ammonia water was dissolved, and the magnetic material was dipped therein for one minute instead of performing stirring for 120 minutes after addition of the magnetic material.

The relative permeability and the specific resistance were measured for the resulting magnetic particles in the same manner as that described above. As a result, the relative permeability was 27, and the specific resistance was $9.8\times10^{4}$ (Ω·cm).

(Sample No. 23)

Magnetic particles were obtained as in Example 1 except that an inorganic phosphoric acid was used instead of an organic phosphoric acid or a salt thereof.

It is confirmed from the results that even in the case where a mixture of a metal alkoxide and an organic phosphoric acid having the same composition as that of the present disclosure, when a sol-gel reaction is not used, a sufficient specific resistance cannot be obtained.

Furthermore, in the case where an inorganic phosphoric acid was used instead of an organic phosphoric acid or a salt thereof, the relative permeability and the specific resistance were lower than the case where an organic phosphoric acid or a salt thereof was used. As is evident from this result, the hydrocarbon group of the organic phosphoric acid has a specific effect in improving relative permeability and specific resistance. Furthermore, Table 1 shows that when the amount of the organic phosphoric acid or a salt thereof is 0.3 parts by weight or more relative to the magnetic material and when the weight ratio of the organic phosphoric acid or a salt thereof to the metal alkoxide is 5 or less, high specific resistance can be obtained.

Example 2

As described below, magnetic particles, each including an insulating coating film made from a mixture containing a metal alkoxide, a silane coupling agent, and an organic phosphoric acid or a salt thereof, and a dust core formed of such magnetic particles were produced.

The following compounds were prepared as silane coupling agent acid salts.

Silane coupling agent 1: octadecyltrimethoxysilane

Silane coupling agent 2: hexadecyltrimethoxysilane

Silane coupling agent 3: 3-glycidyloxypropyltrimethoxysilane

Silane coupling agent 4: 8-methacryloyloxy-octyltrimethoxysilane

Silane coupling agent 5: 8-(2-aminoethylamino)octyltrimethoxysilane

Silane coupling agent 6: 8-glycidyloxy-octyltrimethoxysilane

Silane coupling agent 7: aminopropyltriethoxysilane

Silane coupling agent 8: 3-(methacryloyloxy)propyltrimethoxysilane

Silane coupling agent 9: decyltrimethoxysilane

Magnetic particles and dust cores were produced as in Example 1 except that part of the metal alkoxide was replaced by a silane coupling agent and a coating material was prepared by mixing at the ratio shown in Table 2. For comparison purpose, Sample 11 is also shown.

TABLE 2

| | Coating material | | | | | Organic phosphoric acid or salt thereof | | | |
|---|---|---|---|---|---|---|---|---|---|
| | Metal alkoxide | | Silane coupling agent | | | | | | Specific |
| Sample No. | Type | Mass ratio | Type | Mass ratio | Amount of use | Type | Amount of use | Relative permeability | resistance (Ω · cm) |
| 11 | 1 | 100 | — | 0 | 0.6 | 6 | 1.0 | 35 | $3.8 \times 10^{12}$ |
| 31 | 1 | 98 | 1 | 2 | 0.6 | 6 | 1.0 | 41 | $4.1 \times 10^{13}$ |
| 32 | 1 | 80 | 1 | 20 | 0.6 | 6 | 1.0 | 41 | $5.3 \times 10^{13}$ |
| 33 | 1 | 60 | 1 | 40 | 0.6 | 6 | 1.0 | 41 | $5.1 \times 10^{13}$ |
| 34 | 1 | 90 | 2 | 10 | 0.6 | 6 | 1.0 | 41 | $5.2 \times 10^{13}$ |
| 35 | 1 | 85 | 3 | 15 | 1.0 | 1 | 1.0 | 38 | $6.8 \times 10^{12}$ |
| 36 | 1 | 70 | 4 | 30 | 2.0 | 7 | 1.0 | 37 | $4.0 \times 10^{13}$ |
| 37 | 1 | 85 | 5 | 15 | 2.0 | 6 | 1.0 | 40 | $7.0 \times 10^{13}$ |
| 38 | 1 | 50 | 6 | 50 | 1.0 | 8 | 1.0 | 40 | $1.9 \times 10^{13}$ |
| 39 | 1 | 90 | 7 | 10 | 0.6 | 6 | 1.0 | 38 | $5.0 \times 10^{13}$ |
| 40 | 1 | 80 | 8 | 20 | 1.0 | 6 | 1.0 | 38 | $7.8 \times 10^{12}$ |
| 41 | 1 | 70 | 9 + 3 | 25 + 5 | 1.0 | 6 | 1.0 | 40 | $1.3 \times 10^{13}$ |
| 42 | 1 | 80 | 1 | 20 | 0.2 | 1 | 1.0 | 41 | $5.5 \times 10^{13}$ |
| 43 | 1 | 80 | 1 | 20 | 0.6 | 3 | 1.0 | 41 | $9.2 \times 10^{12}$ |
| 44 | 1 | 80 | 1 | 20 | 0.05 | 6 | 1.0 | 41 | $8.1 \times 10^{12}$ |

The amount of use of each of the coating material and the organic phosphoric acid or a salt thereof is the amount (parts by weight) relative to 100 parts by weight of Fe—Si—Cr alloy particles.

The mass ratio of each of the metal alkoxide and the silane coupling agent is the mass ratio of each of the metal alkoxide and the silane coupling agent in the coating material.

It is confirmed from the results that in Samples 31 to 44 in which the silane coupling agent is added exhibit higher relative permeability. In particular, in samples in which the silane coupling agent having a long chain length is used, a tendency is confirmed that higher relative permeability is exhibited.

Example 3

In Sample Nos. 50 to 56, magnetic particles were produced by the same method as that in Example 1 of the first embodiment except that other surfactants were used instead of the organic phosphoric acid or a salt thereof, and the specific resistance and the relative permeability were evaluated by the same methods as those in Example 1. The amounts of the metal alkoxide and the surfactant and the evaluation results are shown in Table 3. Table 3 further includes Sample Nos. 3 to 5, 15 to 18, and 23 of Example 1. Sample No. 23 is a comparative example.

TABLE 3

| | Metal alkoxide | | Surfactant | | | Specific |
|---|---|---|---|---|---|---|
| Sample No. | Type | Amount of use | Type | Amount of use | Relative permeability | resistance (Ω · cm) |
| 23* | Tetraethoxysilane | 2.0 | — | 0.5 | 30 | $8.8 \times 10^{5}$ |
| 3 | Tetraethoxysilane | 2.0 | Sodium polyoxyalkylene styryl phenyl ether phosphate | 0.3 | 37 | $5.6 \times 10^{11}$ |
| 4 | Tetraethoxysilane | 2.0 | Sodium polyoxyalkylene styryl phenyl ether phosphate | 0.5 | 37 | $6.2 \times 10^{12}$ |
| 5 | Tetraethoxysilane | 2.0 | Sodium polyoxyalkylene styryl phenyl ether phosphate | 1.0 | 37 | $2.9 \times 10^{12}$ |
| 15 | Tetraethoxysilane | 2.0 | Sodium polyoxyalkylene alkyl ether phosphate | 1.0 | 37 | $3.7 \times 10^{12}$ |
| 16 | Tetraethoxysilane | 2.0 | Polyoxyalkylene alkyl aryl ether phosphoric acid monoethanolamine salt | 1.0 | 37 | $4.1 \times 10^{12}$ |
| 17 | Tetraethoxysilane | 2.0 | Sodium alkyl ether phosphate | 1.0 | 38 | $4.3 \times 10^{12}$ |
| 18 | Tetraethoxysilane | 2.0 | Unsaturated polyoxyethylene alkyl | 1.0 | 37 | $3.9 \times 10^{12}$ |

TABLE 3-continued

| | Metal alkoxide | | Surfactant | | | Specific |
|---|---|---|---|---|---|---|
| Sample No. | Type | Amount of use | Type | Amount of use | Relative permeability | resistance (Ω · cm) |
| | | | phenyl ether ammonium phosphate | | | |
| 50 | Tetraethoxysilane | 2.0 | Sodium polyoxyethylene tridecyl ether sulfate | 1.0 | 34 | $2.9 \times 10^{8}$ |
| 51 | Tetraethoxysilane | 2.0 | Sodium dodecylbenzenesulfonate | 1.0 | 35 | $1.8 \times 10^{10}$ |
| 52 | Tetraethoxysilane | 2.0 | Polyoxyethylene alkyl ether styrenated phenyl ether ammonium sulfate | 1.0 | 35 | $6.9 \times 10^{9}$ |
| 53 | Tetraethoxysilane | 2.0 | Polyoxyethylene tridecyl ether | 1.0 | 34 | $1.1 \times 10^{9}$ |
| 54 | Tetraethoxysilane | 2.0 | Polyoxyethylene sorbitan monostearate | 1.0 | 35 | $9.5 \times 10^{8}$ |
| 55 | Tetraethoxysilane | 2.0 | Lauryl trimethyl ammonium chloride | 1.0 | 35 | $7.5 \times 10^{9}$ |
| 56 | Tetraethoxysilane | 2.0 | Lauryl dimethyl ethyl ammonium ethyl sulfate | 1.0 | 35 | $1.0 \times 10^{10}$ |

It is confirmed from Table 3 that by using a surfactant having a lipophilic group and a hydrophilic group, high magnetic permeability and high specific resistance can be obtained. In particular, it is confirmed that, in Samples 3 to 5, 15 to 18, and 50 to 56 in which 0.3 parts by weight or more of the surfactant is used relative to 100 parts by weight of Fe—Si—Cr alloy particles, high magnetic permeability and high specific resistance are exhibited. Furthermore, it is found that, Sample Nos. 3 to 5 and 15 to 18, in which an organic phosphoric acid or a salt thereof is used among surfactants, have a high specific resistance of $5.6\times10^{11}$ Ω·cm or more.

Example 4

Magnetic particles and dust cores were produced as in Sample Nos. 50 to 56 of Example 3 except that part of the metal alkoxide of Example 3 was replaced by a silane coupling agent, and a coating material was prepared by mixing at the ratio shown in Table 4.

TABLE 4

| | Coating material | | | | | Surfactant | | | |
|---|---|---|---|---|---|---|---|---|---|
| | Metal alkoxide | | Silane coupling agent | | | | | | |
| Sample No. | Type | Mass ratio | Type | Mass ratio | Amount of use | Type | Amount of use | Relative permeability | Specific resistance |
| 60 | Tetraethoxysilane | 70 | 8-(2-aminoethylamino)octyltrimethoxysilane | 30 | 0.8 | Sodium dodecyl-benzenesulfonate | 1.0 | 38 | $2.8 \times 10^{12}$ |
| 61 | Tetraethoxysilane | 80 | 8-glycidyloxy-octyltrimethoxysilane | 20 | 1.0 | Polyoxyethylene tridecyl ether | 1.0 | 37 | $3.9 \times 10^{12}$ |
| 62 | Tetraethoxysilane | 70 | decyltrimethoxysilane | 30 | 1.0 | Lauryl dimethyl ethyl ammonium ethyl sulfate | 1.0 | 38 | $9.6 \times 10^{11}$ |

As is evident from comparison between Sample Nos. 60 and 51, between Sample Nos. 61 and 53, and between Sample Nos. 62 and 56, magnetic particles, each having an insulating coating film made from a mixture containing a metal alkoxide, a silane coupling agent, and a surfactant can provide a coil component having high relative permeability and high specific resistance.

INDUSTRIAL APPLICABILITY

Magnetic particles according to the present disclosure are suitably used as a material for a coil component. Such a coil component is suitably used in an electrical device or an electronic device which is, in particular, used in the high-frequency range.

What is claimed is:

1. Magnetic particles, each comprising a core made of a magnetic material, and a first insulating coating film and a second insulating coating film which cover the core made of a magnetic material, wherein the first insulating coating film and the second insulating coating film are formed of a sol-gel reaction product, and one or both of the first insulating coating film and the second insulating coating film includes a surfactant that is at least one selected from the group consisting of sodium polyoxyalkylene styryl phenyl ether phosphate, sodium polyoxyalkylene alkyl ether phosphate, polyoxyalkylene alkyl aryl ether phosphoric acid monoethanolamine salt, sodium alkyl ether phosphate, unsaturated polyoxyethylene alkyl phenyl ether ammonium phosphate, sodium polyoxyethylene tridecyl ether sulfate, sodium dodecylbenzenesulfonate, polyoxyethylene alkyl ether styrenated phenyl ether ammonium sulfate, polyoxyethylene tridecyl ether, polyoxyethylene sorbitan monostearate, lauryl trimethyl ammonium chloride, and lauryl dimethyl ethyl ammonium ethyl sulfate, wherein a content of the surfactant is 0.05 parts by weight or more relative to 100 parts by weight of the magnetic material.

2. The magnetic particles according to claim 1, wherein one or both of the first insulating coating film and the second insulating coating film are formed of a sol-gel reaction product of a mixture of a metal alkoxide and the surfactant.

3. The magnetic particles according to claim 2, wherein the first insulating coating film is formed of a sol-gel reaction product of a mixture of a metal alkoxide, the surfactant, and a silane coupling agent.

4. The magnetic particles according to claim 3, wherein the second insulating coating film is formed of a material different from that of the first insulating coating film.

5. The magnetic particles according to claim 2, wherein the second insulating coating film is formed of a material different from that of the first insulating coating film.

6. The magnetic particles according to claim 2, wherein the weight ratio of the metal alkoxide to the surfactant is from 0.06 to 40.0.

7. The magnetic particles according to claim 1, wherein the first insulating coating film is formed of a sol-gel reaction product of a mixture of a metal alkoxide, the surfactant, and a silane coupling agent.

8. The magnetic particles according to claim 7, wherein the second insulating coating film is formed of a material different from that of the first insulating coating film.

9. The magnetic particles according to claim 1, wherein the second insulating coating film is formed of a material different from that of the first insulating coating film.

10. The magnetic particles according to claim 1, wherein the magnetic particles have a relative permeability of 28 or greater and a specific resistance of $7.8\times10\hat{}6$ Ω·cm or greater.

11. The magnetic particles according to claim 1, wherein the magnetic particles have a relative permeability of 34 or greater and a specific resistance of $1.1\times10\hat{}9$ Ω·cm or greater.

12. Magnetic particles, each comprising a core made of a magnetic material, and an insulating coating film which covers the core made of a magnetic material, wherein the insulating coating film is formed of a reaction product of a metal alkoxide and a surfactant, the surfactant being at least one selected from the group consisting of sodium polyoxyalkylene styryl phenyl ether phosphate, sodium polyoxyalkylene alkyl ether phosphate, polyoxyalkylene alkyl aryl ether phosphoric acid monoethanolamine salt, sodium alkyl ether phosphate, unsaturated polyoxyethylene alkyl phenyl ether ammonium phosphate, sodium polyoxyethylene tridecyl ether sulfate, sodium dodecylbenzenesulfonate, polyoxyethylene alkyl ether styrenated phenyl ether ammonium sulfate, polyoxyethylene tridecyl ether, polyoxyethylene sorbitan monostearate, lauryl trimethyl ammonium chloride, and lauryl dimethyl ethyl ammonium ethyl sulfate, wherein a content of the surfactant is 0.05 parts by weight or more relative to 100 parts by weight of the magnetic material.

13. The magnetic particles according to claim 12, wherein the insulating coating film is formed of a reaction product of a metal alkoxide, the surfactant, and a silane coupling agent.

* * * * *